(12) United States Patent
Mehta et al.

(10) Patent No.: US 10,848,563 B2
(45) Date of Patent: Nov. 24, 2020

(54) ON-DEVICE, APPLICATION-SPECIFIC COMPLIANCE ENFORCEMENT

(71) Applicant: VMware, Inc., Palo Alto, CA (US)

(72) Inventors: Nikhil Mehta, Atlanta, GA (US); Sanjay Satagopan, Atlanta, GA (US); Ali Mohsin, Alpharetta, GA (US); Simon Brooks, Cupertino, CA (US); Ryan Turner, Alpharetta, GA (US); Lucas Chen, Dunwoody, GA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/133,159

(22) Filed: Sep. 17, 2018

(65) Prior Publication Data
US 2020/0092374 A1     Mar. 19, 2020

(51) Int. Cl.
| | | |
|---|---|---|
| *H04L 29/08* | (2006.01) |
| *H04L 29/06* | (2006.01) |
| *G06F 11/07* | (2006.01) |
| *G06F 21/12* | (2013.01) |
| *H04L 12/24* | (2006.01) |
| *G06F 8/60* | (2018.01) |

(52) U.S. Cl.
CPC ........ *H04L 67/125* (2013.01); *G06F 11/0793* (2013.01); *G06F 21/121* (2013.01); *H04L 41/0893* (2013.01); *H04L 63/20* (2013.01); *H04L 67/36* (2013.01); *G06F 8/60* (2013.01)

(58) Field of Classification Search
CPC ....... H04L 67/36; H04L 67/125; H04L 63/20; H04L 41/0893; G06F 11/0793; G06F 21/121; G06F 8/60

USPC ......................................................... 709/223
See application file for complete search history.

(56) References Cited

U.S. PATENT DOCUMENTS

| | | | |
|---|---|---|---|
| 10,382,306 B2* | 8/2019 | Chen .................... | H04L 43/0876 |
| 10,581,987 B2* | 3/2020 | Chen ....................... | H04L 67/22 |
| 2009/0199178 A1* | 8/2009 | Keller ..................... | G06F 9/455 |
| | | | 718/1 |
| 2011/0269444 A1* | 11/2011 | Abel ..................... | H04L 63/104 |
| | | | 455/418 |
| 2012/0117478 A1* | 5/2012 | Vadde ....................... | G06F 9/54 |
| | | | 715/736 |
| 2013/0007245 A1* | 1/2013 | Malik ................. | H04L 41/0816 |
| | | | 709/223 |
| 2013/0111541 A1* | 5/2013 | Yin ................... | H04W 12/0027 |
| | | | 726/1 |
| 2013/0298185 A1* | 11/2013 | Koneru ................ | G06F 15/173 |
| | | | 726/1 |

(Continued)

Primary Examiner — James E Springer
(74) Attorney, Agent, or Firm — Clayton, McKay & Bailey, PC

(57) ABSTRACT

Examples herein describe systems and methods for on-device, application-specific compliance enforcement. An example method can include receiving, at a user device, an application having a compliance engine. The user device can also store a compliance rule that applies to the received application. The compliance rule can specify a condition and a remedial action for the application. The user device can execute the application. The application can determine, using the compliance engine within the application, whether the condition is present. The determination can be made regardless of whether the device has internet or cellular connectivity. Based on determining that the condition is present, the application can perform the remedial action.

20 Claims, 6 Drawing Sheets

(56) References Cited

U.S. PATENT DOCUMENTS

| | | | | |
|---|---|---|---|---|
| 2014/0359777 A1* | 12/2014 | Lam | ............... | H04W 12/0027 |
| | | | | 726/25 |
| 2016/0092685 A1* | 3/2016 | Tse | ............... | G06F 21/6218 |
| | | | | 726/1 |
| 2016/0378113 A1* | 12/2016 | Bernhardt | ............... | G08G 5/003 |
| | | | | 701/3 |
| 2017/0012846 A1* | 1/2017 | Chen | ............... | H04L 43/0876 |
| 2017/0060654 A1* | 3/2017 | Nandakumar | ............... | G06F 11/079 |
| 2017/0300689 A1* | 10/2017 | Phanse | ............... | G06F 21/60 |

\* cited by examiner

FIG. 3

ON-DEVICE, APPLICATION-SPECIFIC COMPLIANCE ENFORCEMENT

BACKGROUND

Compliance enforcement can allow an entity, such as an enterprise, to manage a large number of devices without compromising on security. A system administrator can craft compliance rules that are applied to the managed device. The compliance rules can be used to assess the status of a device and, if necessary, take some sort of action with respect to that device.

Traditionally, compliance is evaluated and enforced at a central server or by a dedicated agent installed on the managed device. For example, a managed device can include management software (the agent) that collects status information about the device and transmits that information to the server. The status information can include information relating to software or firmware on the device, the geographic location of the device, or any other information about the status of the device. The server receives this information and determines whether any compliance rules are being violated. If a violation occurs, the server can determine a remedial action and cause the device to carry out that action. The agent application can also locally enforce some compliance rules on the managed device.

One shortcoming of this traditional compliance framework is the reliance on a central server for evaluating and enforcing the compliance rules. When a device is offline, for example, the server loses the ability to evaluate and enforce compliance. Even when the device is online, the server may not have the ability to enforce compliance differently for different applications on a single device. For example, compliance software built into the operating system cannot efficiently and effectively perform application-specific compliance enforcement. The broad application of compliance rules across all applications lacks the granularity required by some enterprise customers.

Another shortcoming is the requirement to install a dedicated agent on the device, which needs frequent updating and may receive resistance from users to adoption. The agent also tends to enforce compliance based on the device-level compliance, which causes all applications on a managed device to be restricted in a similar way. For example, if the compliance rule evaluation (whether at the agent or a compliance server) detects that a device is in an untrusted location, the rules would typically restrict all corporate connections in a similar way. One example of a restriction is that connections from all applications that access corporate resources can be disabled. However, it would be preferred to have control of enforcing compliance rules on an application-by-application basis to account for differing security requirements and scenarios.

As a result, a need exists for application-specific compliance enforcement that can be evaluated and enforce on the device itself, without requiring a server connection.

SUMMARY

Examples described herein include systems and methods for on-device, application-specific compliance enforcement. An example method can include receiving, at a user device, an application having a compliance engine. The user device can also store a compliance rule that applies to the received application. The compliance rule can specify a condition and a remedial action for the application. The user device can execute the application. The application can determine, using the compliance engine within the application, whether the condition is present. The determination can be made regardless of whether the device has internet or cellular connectivity. Based on determining that the condition is present, the application can perform the remedial action.

Performing the remedial action can include restricting functionality of the application without restricting functionality of other applications present on the user device. In this sense, the compliance enforcement can be considered application-specific. Performing the remedial action can also include blocking access to the application. Regardless of the remedial action taken, the method can include sending a report to a management server, indicating the remedial action taken by the application. The report can include additional information, such as the conditions leading to the remedial action.

The method can also include receiving, at the user device, a second compliance rule that applies to a second application and specifies a second condition and a second remedial action. A compliance engine of the second application can determine whether the second condition is present. Based on that determination, the second application can perform the second remedial action. The second remedial action can restrict functionality of the second application without restriction functionality of the first application.

The example methods summarized above can be incorporated into a non-transitory, computer-readable medium having instructions that, when executed by a processor associated with a computing device, cause the processor to perform stages for dynamically determining enrollment requirements and enrolling a user device into a management system. Additionally, the example methods summarized above can be implemented in a system including, for example, a user device and an authentication server.

Both the foregoing general description and the following detailed description are exemplary and explanatory only and are not restrictive of the examples, as claimed.

BRIEF DESCRIPTION OF THE DRAWINGS

FIG. 3 is an example graphical user interface ("GUI") for establishing application-based compliance rules.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples herein describe systems and methods for on-device, application-specific compliance enforcement. An example method can include receiving, at a user device, an application having a compliance engine. The user device can also store a compliance rule that applies to the received application. The compliance rule can specify a condition and a remedial action for the application. The user device can execute the application. The application can determine, using the compliance engine within the application, whether the condition is present. The determination can be made regardless of whether the device has internet or cellular connectivity. Based on determining that the condition is present, the application can perform the remedial action.

Figure 1A:
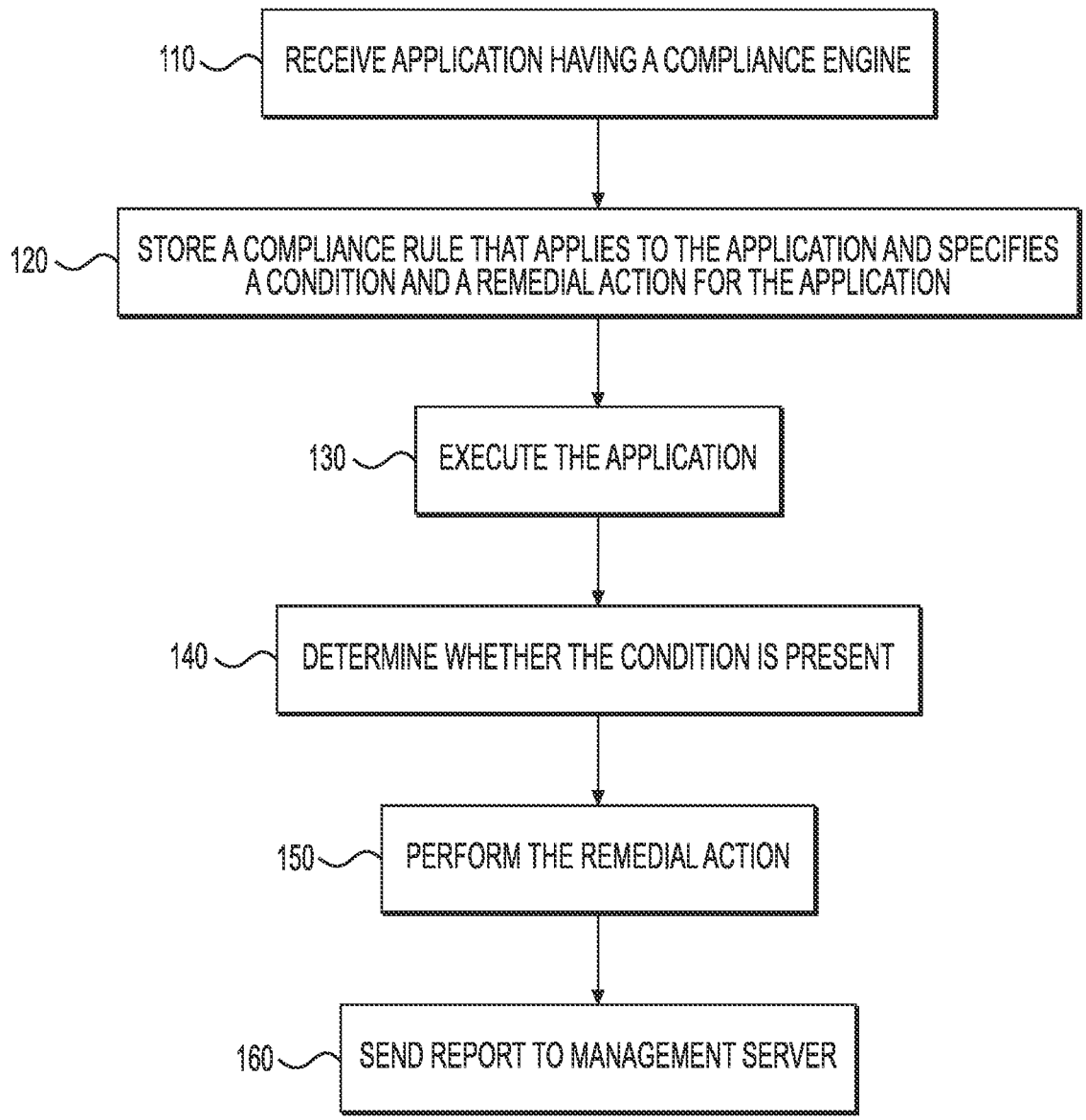
FIG. 1A is a flowchart of an example method for performing compliance enforcement.
Figure 1B:
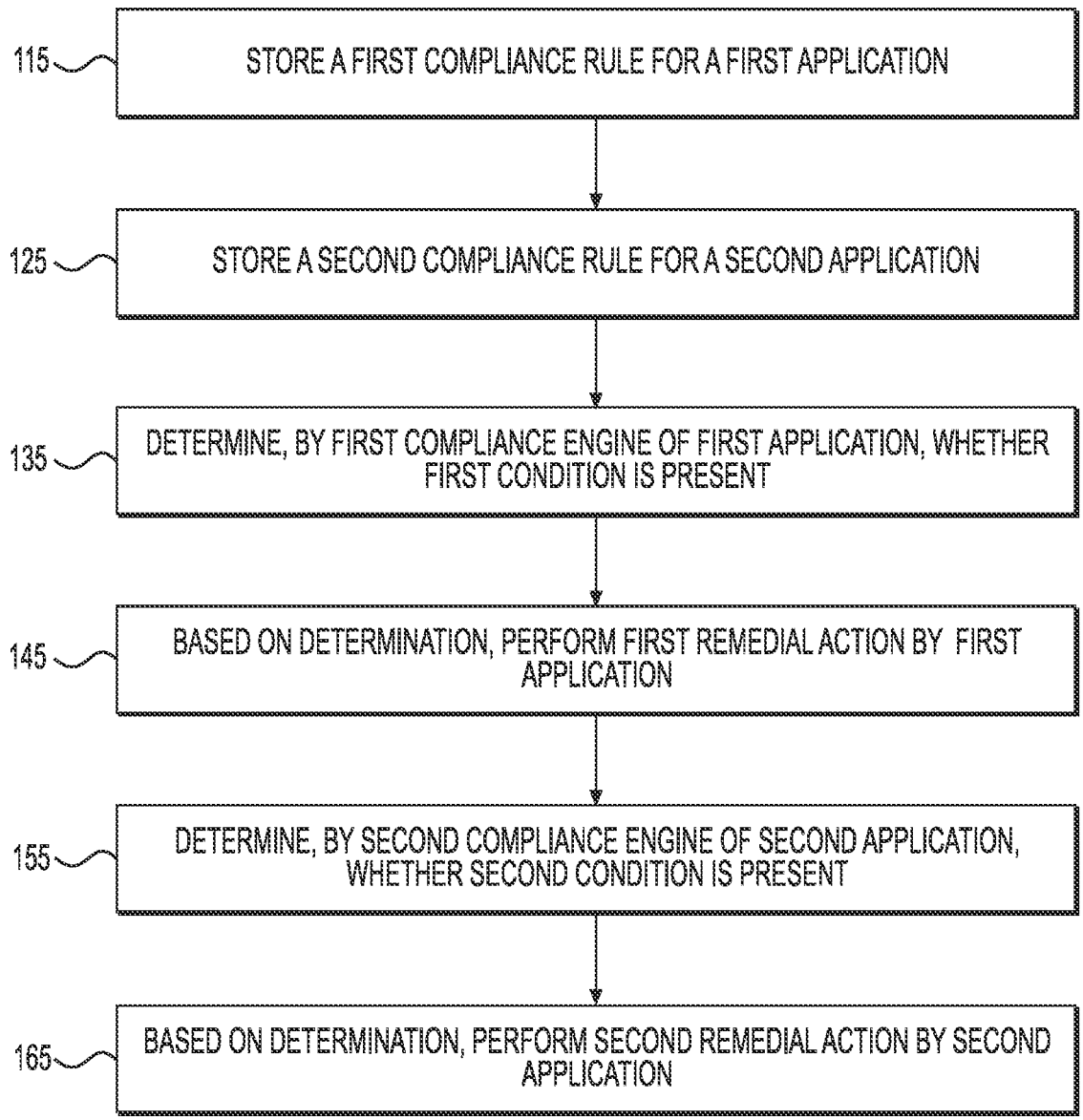
FIG. 1B is a flowchart of an example method for performing compliance enforcement.
Figure 2:
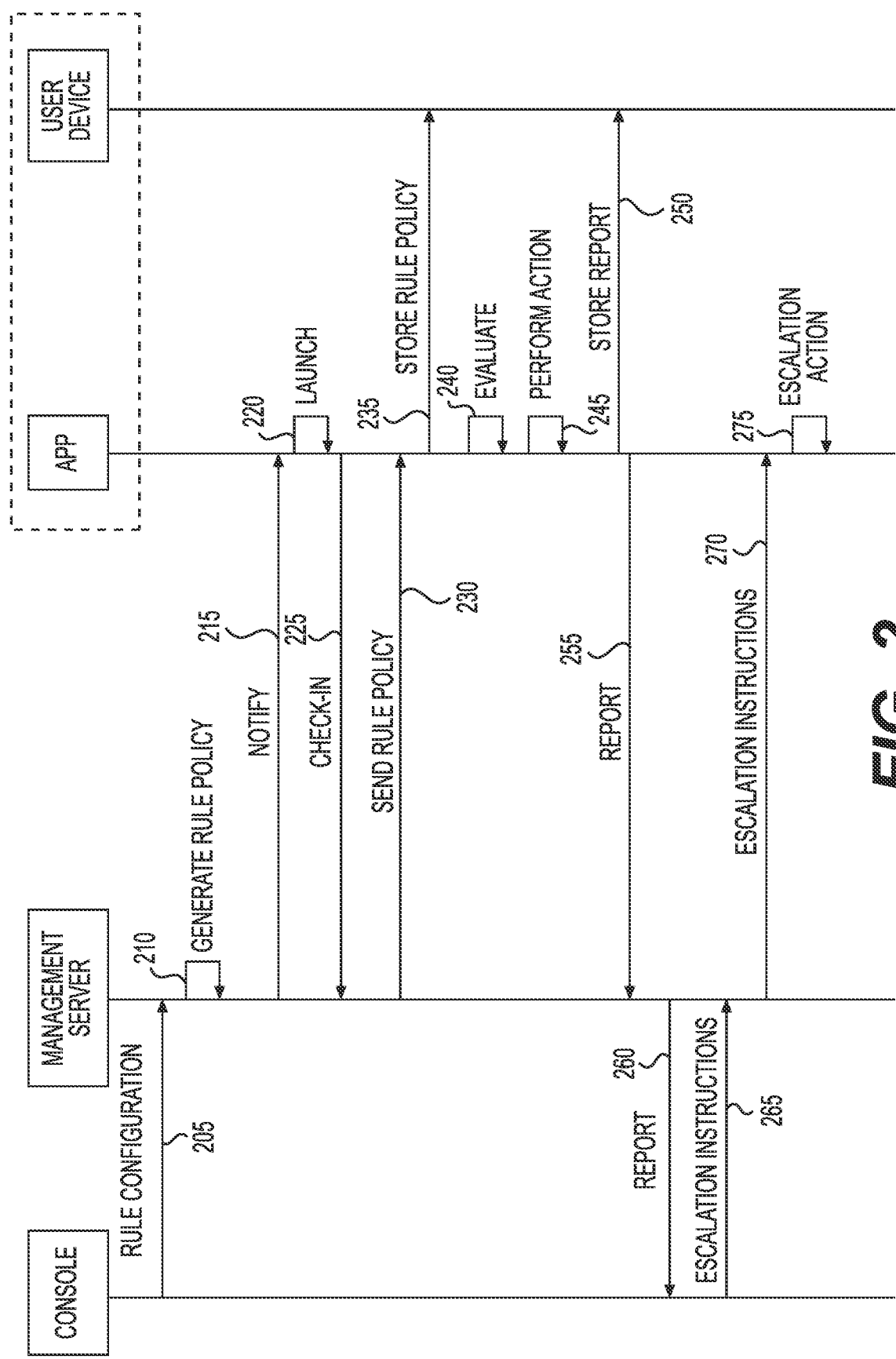
FIG. 2 is a sequence diagram of an example method for performing compliance enforcement.
Figure 3:
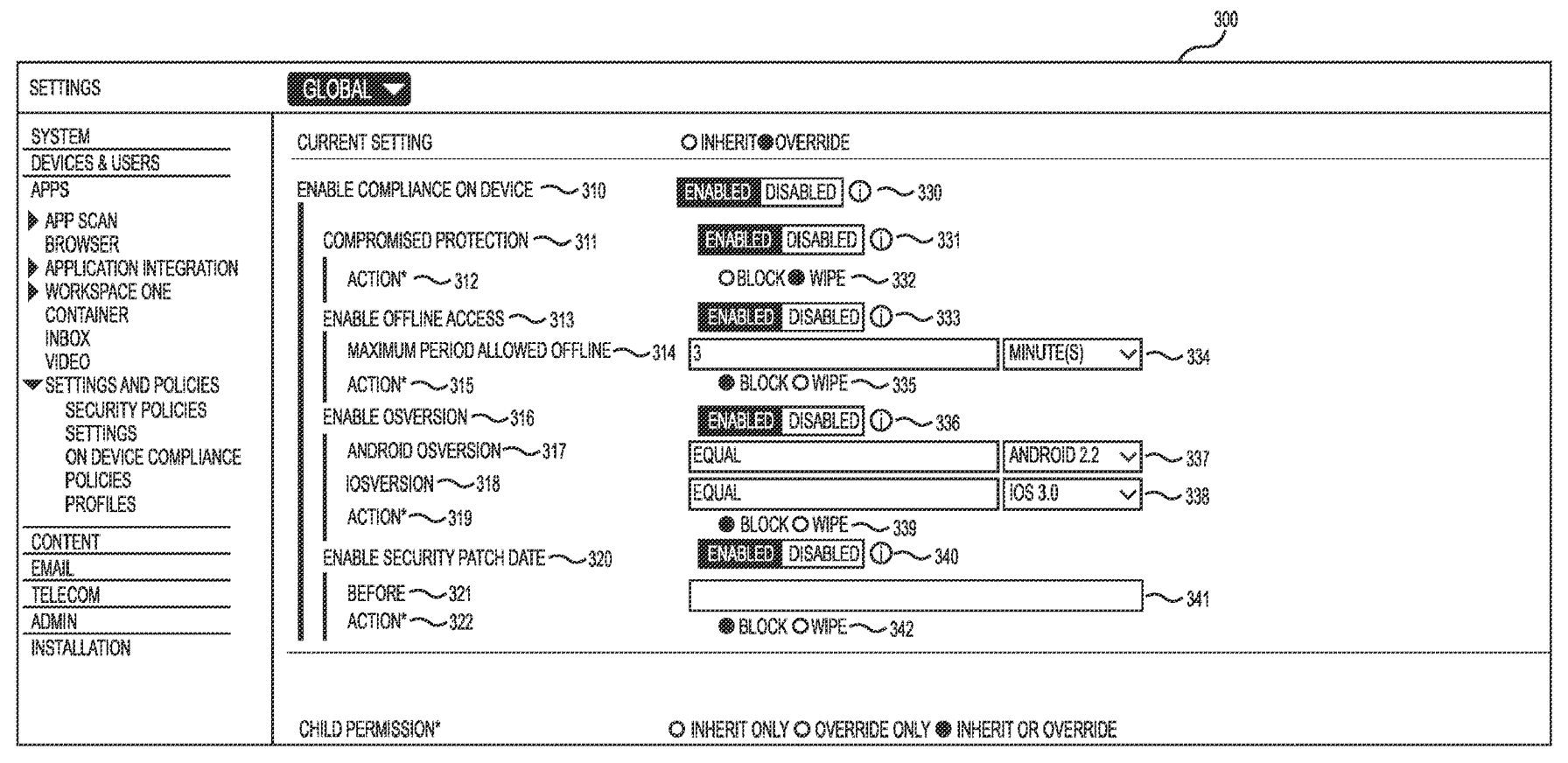
Figure 4:
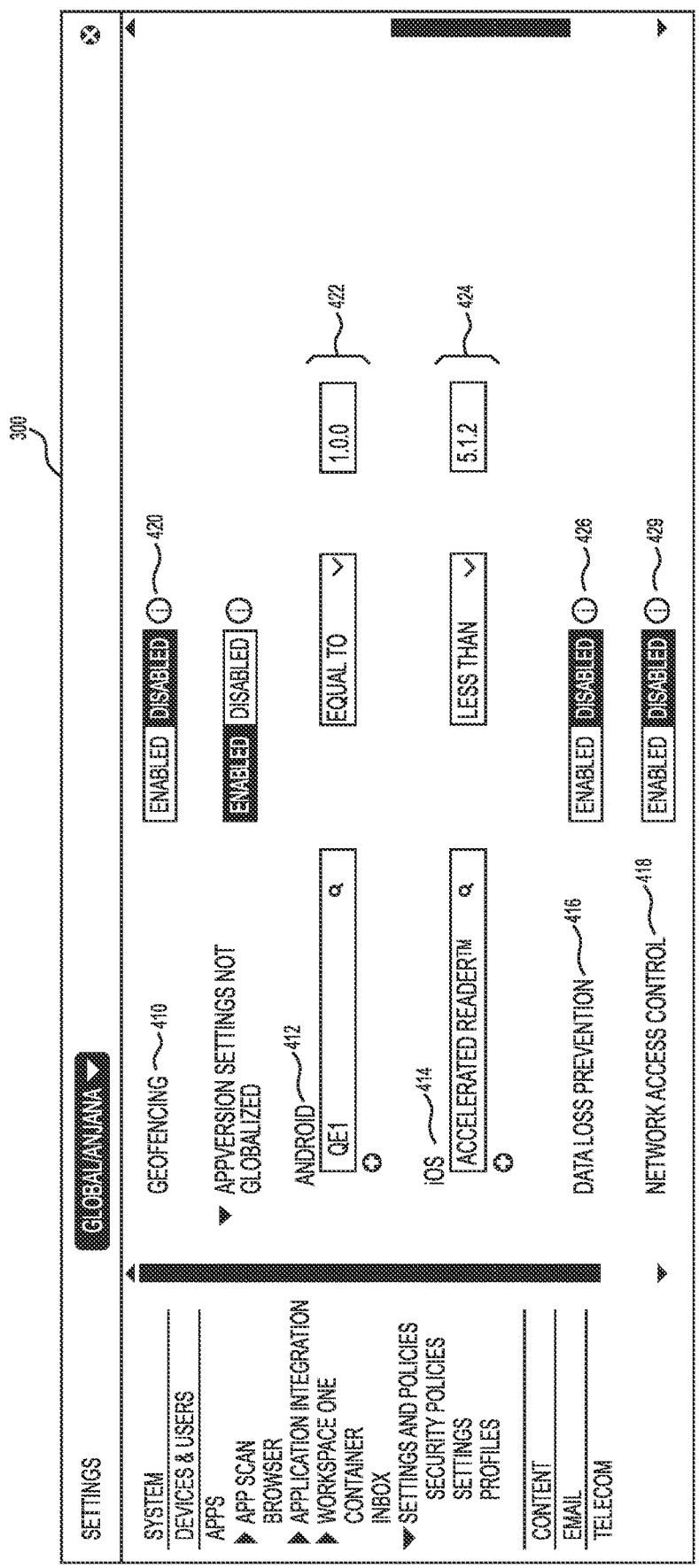
FIG. 4 is an example GUI for establishing application-based compliance rules.
Figure 5:
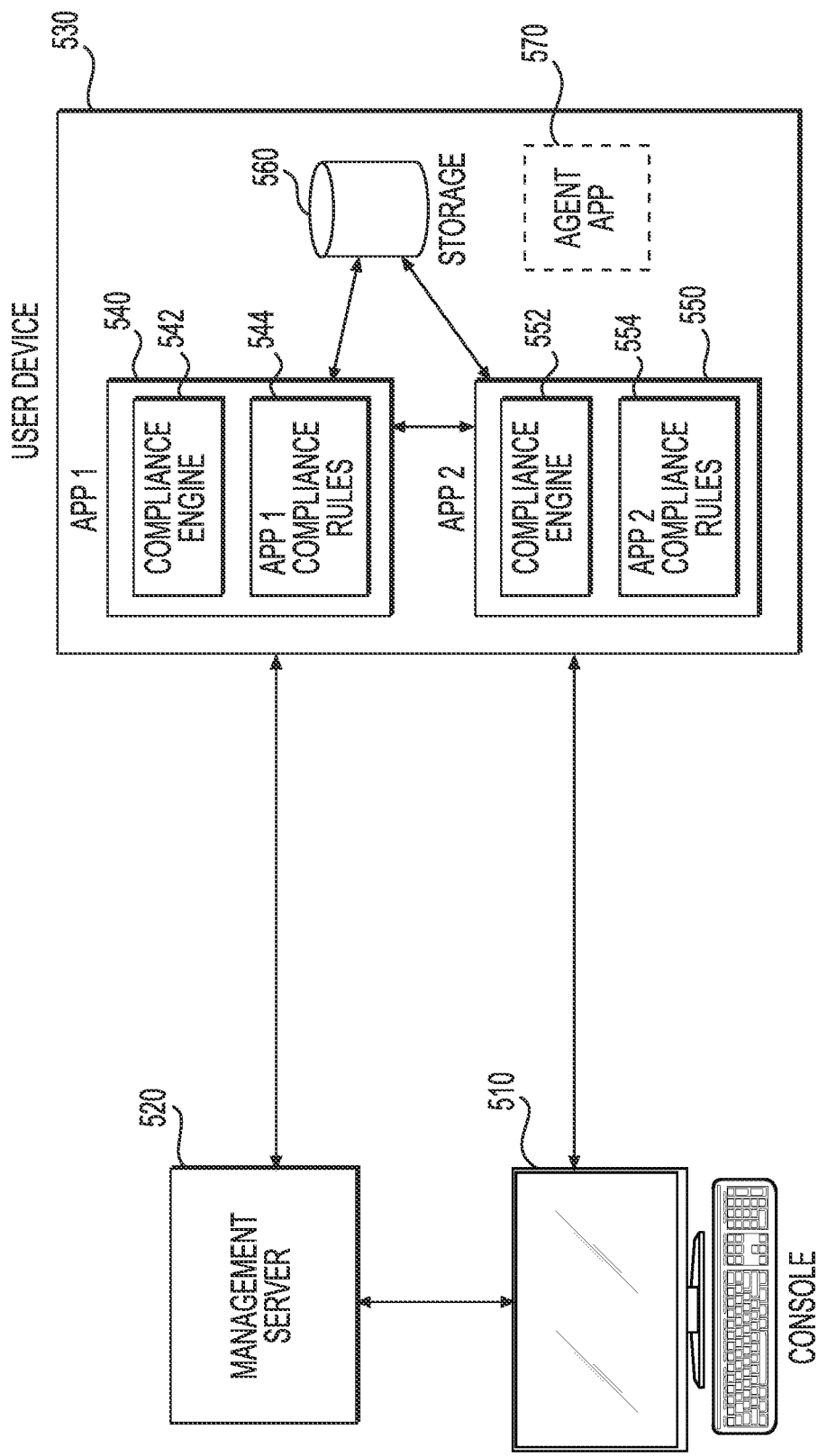
FIG. 5 is a system diagram of an example system for performing the example methods disclosed herein.

FIGS. 1A and 1B provide flowcharts of example methods for performing on-device, application-specific compliance enforcement. FIG. 2 provides a sequence diagram of an example method for performing on-device, application-specific compliance enforcement. FIGS. 3 and 4 provide example GUIs for performing on-device, application-specific compliance enforcement. FIG. 5 provides a system diagram of an example system for performing the example methods disclosed herein.

Turning to FIG. 1A, stage 110 can include receiving, at a user device, an application having a compliance engine. The user device can be any computing device, such as a smartphone, laptop, tablet, personal computer, or workstation. A user device can include a non-transitory, computer-readable medium containing instructions that are executed by a processor. Example non-transitory, computer-readable mediums include RAM and ROM, disks, and other memory and storage that is accessible by a USB port, a floppy drive, CD-ROM or DVD-ROM drive, and a flash drive, among others. The user device can also include various hardware accessories such as a camera, microphone, speaker, accelerometer, gyroscope, GPS transmitter, wireless-internet transmitter, NFC transmitter, or other hardware. The user device can execute an operating system that manages system resources and other software installed on the device. The user device can also execute software applications.

The application can be received at the user device based on the user electing to download the application from an application repository, such as APP STORE or GOOGLE PLAY. In some examples, the application can be received based on instructions from a server, such as a management server or application server, pushing the application to the user device. Pushing the application to the user device can include directly transmitting the application to the user device, in one example. In another example, the application can be stored at a location accessible to the user device, and the user device can be instructed to retrieve the application.

For example, the application can be stored in a command queue associated with the user device, such as at a management server. An instruction can then be transmitted to a messaging service associated with the platform of the target user device. The instruction can request that the messaging service send an instruction to the user device to check in with the management server or otherwise determine whether the command queue contains any commands or instructions. If the application is stored in, or identified by, the command queue, the user device can retrieve it by downloading and executing the contents of the command queue.

The application can include a compliance engine. The compliance engine can be a portion of the application. In one example, the compliance engine is a software package created using a software development kit ("SDK"). The SDK can provide a code library that can be incorporated into an application as part of the development of the application. The code provided by the SDK can be implemented by the application to perform various functions specified by the SDK. A single SDK can be used to develop multiple applications. In some examples, the same SDK can be incorporated into the multiple applications, while in other examples the SDK can be modified from one application to the next. The compliance engine can include functionality for performing compliance determinations, as explained in more detail later in this disclosure.

Stage 120 can include storing a compliance rule that applies to the application and specifies a condition and a remedial action for the application. The compliance rule can be transmitted by the management server in some examples—such as by instructing the user device to check in with the management server and, if applicable, execute commands stored in a command queue. The compliance rule can also be transmitted to the user device directly. In some examples, the compliance rule is contained in a profile that is transmitted to the user device. The compliance rule can also be a part of the application received at stage 110.

A compliance rule can set forth one or more conditions that must be satisfied in order for a user device or an application to be deemed compliant. A condition can be positive or negative—that is, a positive condition must be met in order for the user device or application to be compliant, while a negative condition must be absent in order for the user device or application to be compliant. The compliance rule can be executed by the application engine. In one example, the application engine can check an identifier to determine whether a particular compliance rule is intended for that particular application engine rather than one executing as part of a different application.

If compliance is broken, the remedial action can be taken by the compliance engine of the application. Compliance rules can be tailored to the user, such that users within a certain organizational group receive a different compliance rule than users within a different organizational group. Compliance rules can also be tailored to the user device, such that certain types of user devices receive a different compliance rule than other types of user devices—even where the different user devices belong to the same user. Compliance rules can also be specific to an application, as mentioned above. At stage 120, the application can store the compliance rule in a memory storage location on the user device that is accessible to the application. In one example, the storage location can be a shared location accessed by compliance engines of multiple different applications.

Stage 130 can include executing the application. Executing the application at stage 130 can also include checking for new compliance rules or updating an existing compliance rule. The application can check for new compliance rules by accessing a backend settings endpoint that provides application settings to the user device. The check can occur when launching the application from a closed state, for example. The check can also occur whenever the application cycles from the "background" of the operating system to the "foreground" of the operating system. The check can also occur based on the passage of a time period, such as every 10 minutes. If the application has already checked within that time period—due to the application being launched or foregrounded, for example—the time-based check can be skipped in that situation. If the settings endpoint includes a new compliance rule or an update to an existing compliance rule, the application can retrieve and store that rule or update as part of stage 130.

Stage 140 can include determining whether the condition specified by the compliance rule (also referred to as "triggering condition") is present. This stage can be performed directly by the application. In some examples, a compliance rule can specify one or more triggering conditions that, if present, can trigger a remedial action to be performed at stage 150. The remedial action can be performed by the application that was received at stage 110. In some examples, the remedial action can be performed by the application in conjunction with the management server. For example, the application can request a remedial action by the management server at stage 150. Remedial actions can be staged, such that a user of the user device is provided with a chance to remedy the noncompliant aspect before being subjected to additional remedial actions. Various triggering conditions and accompanying remedial actions are described in more detail below.

The determination at stage 140 can include analyzing, by the application, any type of compliance rule. In one example, a compliance rule requires that the operating system of the user device not be modified, such as by being "rooted" or "jailbroken." In that example, the triggering condition for the compliance rule is a determination that the operating system of the user device is modified. The application can make this determination by analyzing a data object reflecting the status of the user device. If the triggering condition exists, then multiple remedial actions can be taken by the application: (1) the application can notify the user that the application is noncompliant, and optionally provide a timeframe indicating when further remedial action will be taken; (2) the application can provide a local enterprise wipe of any enterprise information stored in the application's local storage; (3) the application can lock or block certain services or functionality—for example, by blocking access to some or all of the application or only allowing a "safe" version of the application to execute on the user device, or by instructing the relevant gateway or server to block traffic to or from the application; (4) the application can uninstall itself from the user device; and (5) the application can inform other applications on the device or one or more server endpoints, or both, that the user device has failed the compliance check.

The compliance rule described in the preceding paragraph is merely one example—any compliance rule can be evaluated at stage 140. For example, a compliance rule can specify particular applications that are not authorized to be installed on the user device. This can be useful for preventing blacklisted or malicious applications from being installed on the user device. In that example, the remedial action at stage 150 can include informing the management server that an unauthorized application is installed or blocking all intra-application communication between the blacklisted application and the application received at stage 110.

In another example, a compliance rule can require a particular application version (or newer) of the application be installed. This can ensure that a user is using an appropriate version of the application and avoid security risks or other issues arising from the use of outdated applications. The application can determine whether this condition is met at stage 140. In this example, the remedial action at stage 150 can include blocking functionality of an older instances of the application, blocking all access to the application, or uninstalling the application.

In another example, a compliance rule can require a particular security patch for the operating system or for the application, based on the date of the security patch release for example. The application can determine whether this condition is met at stage 140 and, if the condition is not met, perform a remedial action at stage 150. The remedial action can include, for example, prompting the user to download the security patch, blocking functionality of the application, or uninstalling the application.

In an example, a compliance rule can limit features or functionality of an application based on the user device being "offline." In this example, a user device can be considered offline based on the user device not being connected to the internet, not being connected to cellular data, or both. A user device can also be considered offline if it is unable to check in with a management server within a predetermined period of time. For example, an application can be required to contact or check in with the management server once every hour and receive a confirmation from the management server. Any time elapsing past the hourly check-in can begin a clock tracked by the application. When the clock reaches a predetermined time limit, such as one hour, the application can determine that the user device is offline.

In response to determining that the user device is offline, the application can take a remedial action. The remedial action can include, for example, warning the user that connectivity is required to continue using the application, blocking access to features or functionality within the application, wiping enterprise data accessible to the application, or causing the user device to delete the application. These remedial actions can be staged, such that a user first receives a warning about the lack of connectivity and has a chance to cure that issue. If the user is unable to connect the device adequately, the application can take a further step of limiting access. After having limited access to the application for a period of time, the application can uninstall itself from the device.

In another example, a compliance rule can require that a profile be installed on the user device. The profile can relate to the application, the user, or the user device generally. In one example, a management server sends a profile to be stored on the user device. The profile can include information about the user and user device, including confirmation that the user and user device are enrolled with the management server. The compliance rule can require that a current profile be installed on the device. For example, the compliance rule can require that the profile was updated or replaced within the last 24 hours. If the profile does not meet this requirement, the application can perform a remedial action at stage 150. The remedial action can include informing the management server that an updated profile is not present, limiting functionality of the application, or uninstalling the application. In one example, if the device is offline, the compliance engine can disable the application until the management server can be reached.

In an example, a compliance rule can require the presence or absence of one or more applications (aside from the application received at stage 110) on the user device. For example, the compliance rule can prohibit a blacklisted application from being on the user device. If the blacklisted application is present, the application from stage 110 can take a remedial action such as prompting the user to uninstall the blacklisted application, restricting access to the application, or uninstalling the application.

Similarly, the compliance rule can require a second application to be installed on the user device in order to utilize the application received at stage 110. If the second application is not installed, the application can take a remedial action such as prompting the user to install the application, requesting that a management server push the required application to the user device, or restricting access to the application.

In some examples, a compliance rule can implicate compliance of multiple applications even though the compliance determination is being performed on a per-application basis. As an example, the application from stage 110 can require compliance of another application, such as a security application. The security application can perform its own compliance check to ensure that the user device is updated and compliant with all security policies required by an enterprise. At stage 140, the application can request a compliance status from the security application. If the security application is unable to confirm its own compliance status, the application can perform a remedial action at stage 150. The remedial action can include informing the user of the need to download the security application, sending a message to the management server regarding the compliance failure, or restricting access to the application.

In another example, a compliance rule can be configured to be enforced based on input received by the user device. For example, a compliance rule can specify trigger based on the device receiving input indicating that the user is in an unsecure environment. The input can include, for example, detecting loud talking or music through the microphone of the user device, or comparing a GPS coordinate of the user device with a predetermined list of unsecure locations. If input is received indicating that the user is in an unsecure environment, the application can perform a remedial action. That action can include, for example, blocking sensitive information from being displayed on the screen of the user device, providing a warning that the user appears to be in a compromised environment, or blocking access to the application altogether.

The example compliance rules and remedial actions described above are merely exemplary and are not intended to be limiting. In the example descriptions above, at times a number of example remedial actions are provided. However, any remedial action can apply to any compliance rule, regardless of the example remedial actions listed for any given compliance rule.

Regardless of whether a remedial action is performed at stage 150, the application can send a report to the management server at stage 160. If the compliance rule stored at stage 120 was satisfied and no remedial action was needed at stage 150, for example, the application can send a report to the management server indicating that the application is compliant and that no remedial actions were taken.

On the other hand, if a remedial action was performed at stage 150 based on the determination at stage 140, the application can send a report to the management server indicating the compliance rule, the remedial action, and any other relevant information. For example, the application can send a data object reflecting a status of the user device at the time that the compliance determination was made or at the time that the remedial action was taken. In some examples, sending a report at stage 160 can include sending a message to an administrator. For example, if the application is an email application, it can automatically generate an email to an administrator describing the determination and remedial action taken. In another example, the application can request that a message be sent by another application on the device. For example, a messaging application can send a message, such as an SMS message, to an administrator.

FIG. 1B provides a flowchart of an example method that includes two separate applications that can each perform compliance enforcement on a user device. Stage 115 of FIG. 1B can include storing a first compliance rule for a first application, while stage 125 can include storing a second compliance rule for a second application. As discussed with respect to FIG. 1A, the compliance rule can be transmitted by a management server in some examples, such as examples where the user device is managed by the management server. The user device can be managed by the management server by performing certain enrollment procedures explained with respect to FIG. 5. In that example, the management server can instruct the user device to check with the management server and, if applicable, execute commands stored in a command queue. The compliance rule can also be transmitted to the user device directly, by the management server or another server. Furthermore, the first and second compliance rules can each be a part of, or contained within, the first and second applications, respectively. The compliance rules can be configured to operate with the SDK of the compliance engines, in an example.

However, this example is not limited to a user device that is managed by a management server. Indeed, the examples described herein can be applied to unmanaged devices that are not enrolled with a management server. For example, the first or second applications, or both, can be downloaded from a publicly available application store. The first and second compliance rules can be contained within the download file for the first and second applications, respectively. In that example, either a managed or unmanaged device could receive and store the first and second compliance rules at stages 115 and 125.

Each of the first and second applications can independently perform compliance enforcement on the device without any instructions or communication from a management server. The compliance checking can be performed by compliance engines within each application. As explained above, a compliance engine can be a software package created using an SDK. In some examples, the compliance engines of the first and second application are identical, or at least substantially similar, to one another. For example, the compliance engines can be created using the same SDK but include minor differences to account for the particular application in which the SDK is utilized.

The first and second applications can be any type of applications. In one example, the first or second applications are at least one of: an email application, a file-sharing application, a word processing application, a sales application, a networking application, a software development application, and a portal application. A portal application can be an application that provides access to multiple applications through a "portal" provided at a GUI that includes, for example, icons associated with available applications. The portal application can utilize single sign on ("SSO") or other authentication methods to provide such access.

In some examples, the compliance engines of the first and second application can differ from one another. The compliance engines can be customized in various ways, such as by being equipped to execute different types of commands from one another. Different compliance engines using the same SDK can, for example, implement different methods in the SDK for enforcing different compliance rules. As explained below, the compliance engines can utilize the same or different inputs to perform the same or different functions, as desired.

At stage 135, for example, the compliance engine of the first application can determine whether a first condition is present. The first condition can be set forth by the first compliance rule stored at stage 115. The condition can be positive or negative—that is, a positive condition must be met in order for application to consider the user device compliant, while a negative condition must be absent in order for the application to consider the user device compliant.

This stage can be performed by the compliance engine of the first application. For example, the SDK, or portion of the SDK comprising the compliance engine, can parse an object file reflecting the status of the user device. The object file can be generated by the operating system of the user device, in an example. The object file can include any information about the user device, such as the operating system type and version on the user device, the GPS location of the user device, whether location services are enabled for the user device, a list of applications installed on the device, the battery level of the user device, whether the device is currently locked or unlocked, or any other information about the user device. The operating system can provide the object file upon request from the first application in an example. Although described as an object file, the information regarding the user device can be provided in any format to the first application. In some examples, the first application can generate the object file or gather the information directly.

The first compliance engine can parse the information in the object file and compare that information with the condition specified by the first compliance rule. For example, the first compliance rule can specify that if the operating system of the user device is modified, certain functionality of the first application should be limited. The first compliance engine can parse the data object to determine whether the operating system has been modified and compare that to the requirement of the compliance rule.

Based on that determination, at stage 145, the first application can perform a first remedial action specified by the first compliance rule. Continuing the example above, this stage can include, as a result of determining that the operating system has been modified, performing a remedial action specified by the first compliance rule. The first remedial action can include, for example, limiting functionality of the first application, displaying a warning when the user attempts to launch the first application, or uninstalling the first application. These remedial actions can be performed at stage 145 without input from, or contact with, a management server—such as in the example of an unmanaged user device. If the user device is managed, the first remedial action can include management operations such as sending a message to the management server or to a system administrator, restricting other applications on the user device, or performing a wipe of the user device.

Stages 135 and 145 can be performed by the first application, including being performed by the first compliance engine of the first application. Stages 155 and 165, on the other hand, can be performed by a second application without input from the first application.

Stage 155 can include determining, by the second compliance engine of the second application, whether a second condition is present. The second condition can be set forth by the second compliance rule stored at stage 125, for example. The second condition can be the same as the first condition or it can be different from the first condition. The determination at stage 155 can be performed in a similar manner to the determination at stage 135.

For example, the second compliance engine can perform the determination. The SDK, or portion of the SDK comprising the second compliance engine, can parse an object file reflecting the status of the user device. The object file can be generated by the operating system of the user device, in an example. The object file can include any information about the user device, such as the operating system type and version on the user device, the GPS location of the user device, whether location services are enabled for the user device, a list of applications installed on the device, the battery level of the user device, whether the device is currently locked or unlocked, or any other information about the user device. The operating system can provide the object file upon request from the second application in an example. Although described as an object file, the information regarding the user device can be provided in any format to the second application. In some examples, the second application can generate the object file or gather the information directly. In some examples, the object file used for the determination at stage 155 is the same object file used for the determination at stage 135.

The second compliance engine can parse the information in the object file and compare that information with the condition specified by the second compliance rule. For example, the second compliance rule can specify that if a blacklisted application is installed on the user device, certain functionality of the second application should be limited. The second compliance engine can parse the data object to determine whether the blacklisted application is installed on the user device and compare that to the requirement of the compliance rule.

Based on that determination, at stage 165, the second application can perform a second remedial action specified by the second compliance rule. Continuing the example above, this stage can include, as a result of determining that a blacklisted application is installed on the user device, performing a remedial action specified by the second compliance rule. The second remedial action can include, for example, limiting functionality of the second application, displaying a warning when the user attempts to launch the second application, or uninstalling the second application. Those remedial actions can be performed at stage 165 without input from, or contact with, a management server—such as in the example of an unmanaged user device. If the user device is managed, the second remedial action can include management operations such as sending a message to the management server or to a system administrator, restricting other applications on the user device or performing a wipe of the user device.

In some examples, the first condition specified by the first compliance rule can be the same as the second condition specified by the second compliance rule. For example, both the first and second compliance rules can specify a condition that the operating system not be modified. The first and second remedial actions can be identical to, or different from, one another, regardless of whether the first and second conditions are similar. For example, even if first and second compliance rules both specify a condition that the operating system not be modified, the first and second remedial actions can differ. As an example, the first remedial action carried out by the first compliance engine of the first application can include blocking access to the first application, while the second remedial action carried out by the second compliance engine of the second application can include deleting the second application from the user device.

In some examples, one of the first and second applications can also be an agent application. An agent application can be an application dedicated to management functionality, such as enforcing device-level compliance rules established at a management server. The agent application can operate on the user device in conjunction with another application that performs application-specific compliance enforcement. For example, the agent application can be the first application or second application describe above, or it can be another application separate from the first and second applications.

To further illustrate how the various applications can function simultaneously, an example can include a first application, second application, and agent application. The first application can be an email application and can enforce a compliance rule that specifies if the user device does not have an active WIFI connection, the period email check-ins can be modified to include a longer delay between checks in an effort to conserve cellular data usage. Meanwhile, the second application can be a portal application that can enforce a compliance rule that specifies if the user device is outside of a geofenced area, the portal application can block access to one of the applications available through the portal, such as by graying out the icon displayed in the GUI of the portal application when opened. The agent application can be a dedicated device-management application that can enforce a compliance rule specifying that if the user device is outside of the same geofenced area, the user device requires an additional authentication credential to unlock the device. The various compliance rules and remedial actions associated with these different applications can be performed simultaneously, in parallel, without conflicting with one another.

FIG. 2 provides a sequence diagram of an example method for performing compliance enforcement. At stage 205, an administrator can provide a rule configuration that is transmitted to the management server. The administrator can utilize a console to configure the rule. An administrator can access the console by, for example, navigating to a web location using a web browser on a computing device. The console can also be provided as a standalone application on a computing device. The administrator can use the console to perform various management activities, such as enrolling a user device, creating user groups, pushing device updates, and creating profiles for providing on-demand access to restricted resources. The console can be communicatively coupled to the management server, such that settings or instructions saved at the console are also saved at, or automatically transmitted to, the management server.

The administrator can utilize a GUI provided by the console to configure the rule. Example GUIs for configuring a rule are provided at FIGS. 3 and 4. The rule configured and stored at the management server at stage 205 can be any kind of compliance rule, including any of the example compliance rules discussed herein. In one example, the GUI allows the administrator to select one or more applications having the compliance engine, and then create a rule for execution by the selected application(s).

The management server can receive the configuration instructions and, at stage 210, generate a rule policy. The rule policy can be a file, script, application programming interface ("API") call, or other instruction to be transmitted to a user device and implemented. The rule policy can be considered a "compliance rule" or instructions for enforcing a compliance rule. This disclosure is not intended to be limited by describing a particular file, instruction, or policy as a compliance rule, as the word can mean any or all of the above. The rule policy can include an identifier that allows an application engine to determine whether it should execute the rule policy or particular rules within the rule policy.

At stage 215, the management server can notify the application that a check-in is required—or more specifically, that a compliance rule is available and requires a check-in. The "application" referred to with respect to FIG. 2 can be the first or second applications described in FIG. 1B, for example. The terms "application" and "first application" can be considered synonymous—and are used interchangeably—for at least the description of FIG. 2. The notification at stage 215 is optional, as the application can be configured to check-in with the management server automatically. For example, the application can check-in when the application launches, goes from the background to the foreground of the operating system, or based on a periodic check-in. In some examples, the notification at stage 215 is sent the user device rather than the application, such as by making an API call to the operating system of the user device. The operating system can then transmit the notification to the application in the appropriate manner.

At stage 220, the application can be launched. The application can be launched automatically in some examples. In one such example, the operating system causes the application to launch as a result of receiving the notification at stage 215. If the application is already executing, the method can continue to stage 225.

At stage 225, the application can check in with the management server. This can include, for example, contacting a settings endpoint for the application. The settings endpoint can be used to provide updated settings information and other instructions to the application, such as instructions to install a security update patch or to save and implement the rule generated at stage 210.

The compliance rule can be transmitted to the application at stage 230. Although FIG. 2 shows that the management server transmits the compliance rule to the application, the rule can be transmitted by another server at the direction of the management server. For example, an application server can provide support for the application and provide a settings endpoint that the application accesses from time to time. The application server can send the compliance rule on behalf of the management server at stage 230, in an example.

The application can save the compliance rule to the user device at stage 235. In one example, the application stores the compliance rule in a storage location designated for local storage for the application. That data store can be made available to the application for quick access while the application is executing. In another example, the application can store the compliance rule in a different storage location within the user device.

At stage 240, the application can evaluate the stored compliance rule. The evaluation at stage 240 can be performed by a compliance engine of the application. The compliance engine can be a portion of the application, such as an SDK that has been added to the application's code. The compliance engine can be configured to retrieve a compliance rule from storage, retrieve information about the user device that is relevant to the retrieved compliance rule, and perform a comparison or evaluation at stage 240.

The compliance engine can interpret a compliance rule based on a predetermined or expected format of the compliance rule. For example, the compliance engine can expect a compliance rule to include a first field for an identification of the subject of the compliance rule. This can include a hardware or software entity, a location, a management status, or any other relevant subject. The compliance engine can also expect a second field for a condition indicator that indicates whether the identified subject is required, prohibited, or optional. The compliance engine can further expect a third field for one or more actions to be performed based on comparing the first and second fields to the relevant status of the user device or user. Additionally, in an example, a rule can include an identifier that allows the compliance engine to verify that it should execute the rule.

As an example, the compliance engine can receive a compliance rule prohibiting access to an enterprise resource when a particular application is installed on the user device. The compliance engine can retrieve a data object from the storage of the user device, where the data object describes the compliance rule. The data object can include a first field identifying the application, including application versions if applicable. The data object can also include a second field indicating that the application, or the identified versions of the application, prohibit access to enterprise resources. The data object can include a third field specifying that the application should block access to the enterprise resource when the identified application is installed on the user device.

The third field, or an additional field, can include additional actions to be taken. For example, a fourth field can specify that a notification should be displayed on the user device, informing the user that the user device includes a prohibited application and that the requested access will continue to be denied unless the prohibited application is removed from the device. The notification can include a prompt for the user to accept an action that would place the device in compliance, such as a button corresponding to deleting the prohibited application from the device.

In addition to retrieving the compliance rule, stage 240 can include retrieving state information about the user device. The state information can be contained within a data object describing information about the user device, for example. The data object can be created by the compliance engine of the application in some examples. The compliance engine can query the operating system of the user device to determine relevant information, such as the location of the device, the version of the operating system, a listing of applications installed on the device, and any other relevant information. In some examples, the one or more SDKs comprising the compliance engine can include privileges that allow the compliance engine to request such detail from the operating system of the user device, such as by using an API call or other communication protocol.

Stage 240 can also include comparing the fields of the compliance rule to the data object describing state information of the user device. The compliance engine can determine whether each field of the compliance rule applies, and if so, how it applies. Returning to the example of a compliance rule prohibiting a blacklisted application from being installed on the device, the compliance engine can parse the data object reflecting the state information of the user device to determine if the blacklisted application is present. With respect to the field of the compliance rule prohibiting the blacklisted application, the compliance engine (of the first application) can determine that the prohibition is being followed, or not followed, based on the blacklisted application being present or not. Finally, based on the previous determinations, the compliance engine of the first application can determine that the third field should be implemented, thereby blocking access to certain enterprise resources.

At stage 245, the compliance engine of the first application can perform an action based on the evaluation at stage 240. This stage can include carrying out one or more actions specified by fields within the compliance rule. Continuing the previous example regarding a compliance rule prohibiting a blacklisted application, if the compliance engine of the first application determines that the blacklisted application is present on the user device, the action performed at stage 245 can include rejecting a request for an enterprise resource within the first application. This can include, more specifically, blocking a request made within the first application to download a document stored within an enterprise repository or access an email stored on a secure email server.

Stage 245 can include performing additional actions as well. For example, it can include displaying a notification informing the user why their request was blocked. In the example where a request was blocked due to a blacklisted application on the device, the compliance engine of the first application (in this example, an email application) can cause a notification to be displayed that informs the user, for example, "Your request for access to the email server was blocked because an unauthorized application is installed on your device." The notification can identify the particular unauthorized application or relevant issue, in some examples. The notification can also prompt the user to take an action to resolve the issue, such as "Do you want to delete the unauthorized application from your device now?" The notification can include buttons to accept or decline the offer.

The example described with respect to stages 240 and 245 is merely one example of evaluating a compliance rule and performing an action based on that evaluation. Similar stages can be performed for any compliance rule, regardless of the requirements of the compliance rule or the outcome of the evaluation.

At stage 250, the compliance engine can store a report in a storage location of the user device. The report can include a description of the compliance rule that was evaluated at stage 240, a description of the result of the evaluation (i.e., whether the compliance rule was satisfied or not), and a description of any actions performed at stage 245. The report can be a file that includes this information.

Storing the report locally at stage 250 can allow the application to enforce compliance when the user device is offline without losing any data generated as a result of enforcing the compliance rule. The report can be stored locally and transmitted to the management server at stage 255, when the user device regains connectivity. In some examples, the report can be transmitted to the management server without storing the report locally, such as when the application has a confirmed connection to the management server and the management server confirms receipt of the report. In some examples, the application can transmit the report to the management server and store the report locally simultaneously, or in any order.

At stage 260, the management server can cause the report, or information associated with the report, to be displayed at the console for an administrator to view. The management server can summarize the content of the report in an easy-to-digest manner, such as by providing a visual indication of the compliance rule and resulting action(s) taken. In some examples, the report at stage 260 can be an aggregation of various reports received at the management server. For example, the management server can display a report at stage 260 indicating that 10 user devices have an email application that blocked access to enterprise emails based on the presence of an outdated operating system.

The administrator can provide escalation instructions at stage 265, such as instructing the management server to force corrections at one or more user devices that previously failed a compliance check. In one example, the escalation instructions can instruct the application to override the compliance rule and perform an action that was previously blocked. In another example, the escalation instructions can force an update that causes the application to download a newer version of the application. These instructions can be passed to the management server at stage 265 and then to the application at stage 270. The application can then perform the escalation action at stage 275. In this way, actions taken in response to a compliance rule can be based on a combination of local instructions already on the user device and responsive instructions received from the management server.

As mentioned above, compliance rules can be created, modified, and otherwise controlled at a console that provides a GUI for an administrator. An example GUI 300 is shown in FIGS. 3 and 4. Various settings are provided for enabling or disabling new compliance rules. Setting 310 enables on-device compliance performed by one or more applications on the user device. Buttons 330 allow an administrator to enable or disable this feature. When disabled, compliance checking can be performed at a management server rather than on the device itself. For example, the user device can send state information to the management server, and the management server can compare the state information against one or more compliance rules stored at the management server. When buttons 330 are set to "enabled," the user device can perform compliance checking on the device itself, utilizing a compliance engine within an application, even in situations where the device has no internet or cellular-data connectivity.

Setting 311 can enable compromised protection, which can include protecting against situations where a user device becomes vulnerable to data theft. A user device can become vulnerable when, for example, the device is jailbroken, hacked, or when harmful software is installed. This protection can be enabled or disabled using buttons 331. When enabled, setting 312 can be used to prescribe an action to take when a user device is determined to be vulnerable. In this example, buttons 332 can be used to select between "block" and "wipe." Block can be used block harmful software, such as by blocking the software from executing entirely. Wipe can perform a wipe of the user device. The wipe can be an enterprise-specific wipe that deletes all enterprise-related applications and data from the user device, not just the application running the compliance engine performing the wipe. The wipe can also be a full wipe that deletes all data from the user device. Alternatively, the wipe can be specific to an application, removing only that application and related data. In some examples, a wipe can also include locking the user device or an application from further use.

Setting 313 can be used to enable or disable offline access to the user device or to specific applications on the user device utilizing buttons 333. When enabled, an administrator can set a maximum period of time allowed for offline use at setting 314. Field 334 can be used to specify the particular time period. When enabled, this setting 313 can limit the amount of time a user device, or an application on a user device, can be used while the device is offline. If the user continues to use the device or application beyond the time limit set at field 334, an action can be performed according to setting 315. In this example, setting 315 provides "block" and "wipe" buttons 335, which are similar to buttons 332. In this example, "block" is selected, which can cause an application to be blocked from further use after the time period expires. In some examples, the entire user device can be blocked from use after expiration of the time period.

Setting 316 can enable a restriction on the operating-system version for the user device. Buttons 336 can be used to enable or disable this setting 316. Setting 316 can include two separate settings 317, 318 corresponding to different operating systems—in this example, ANDROID and iOS, respectively. Field 337 allows an administrator to select an ANDROID operating-system version and select an operator that requires the operating-system version on the user device to be equal to, above, equal to or above, below, or equal to or below a particular version. Similarly, field 338 allows an administrator to select an iOS operating-system version and select an operator that requires the operating-system version on the user device to be equal to, above, equal to or above, below, or equal to or below a particular version. Setting 319 can require an action when the relevant operating system does not fit within the requirements set at fields 337 or 338. Buttons 339 allow the administrator to utilize the same "block" or "wipe" functionalities discussed above.

Setting 320 can require the presence of a particular security patch on the user device, based on the date that the security patch was issued. Buttons 340 can be used to enable or disable this setting 320. In this example, setting 321 specifies that security patches issued before a particular date—which can be specified at field 341—should trigger an action specified by field 322. For example, the administrator can put a date of Jan. 1, 2018 in field 341. In that example, a user device or an application having a security patch with a date prior to Jan. 1, 2018, would trigger the action at setting 322. This action can be specified using buttons 342, which in this example include blocking or wiping. This setting can therefore ensure that user devices and applications stay up to date with the latest security patches.

FIG. 4 provides another view of GUI 300 with additional settings. Setting 410, for example, can allow an administrator to enable or disable "geofencing" using buttons 420. Geofencing can utilize GPS or RFID (radio-frequency identification) functionality of a user device to create a virtual geographic boundary. Setting 410 can limit any functionality of the user device, such as particular applications, services, or use of the device entirely, based on the geographic location of the device. This can be useful for devices that are intended to stay within a predetermined area, such as a user device that is intended to stay on premises of an enterprise. In some examples, further options can be established for an administrator to select specific limits on functionality when a user device leaves a geofenced area.

Additional settings 412, 414 can be provided on the GUI for providing application-specific version requirements for applications on ANDROID or iOS user devices, respectively. The administrator can enter or search for an application, or in some examples a security patch, using a search bar associated with each setting 412, 414. The administrator can then utilize fields 422, 424 to select an operator (e.g., less than, equal to, greater than, or some combination thereof) and enter a specific version number. For each setting 412, 414, the administrator can select an add button (shown as a plus sign) to add more applications. Each application can include distinct fields 422, 424 with which to configure the application. This feature allows an administrator to list many applications and select specific application versions that are required for each particular application.

Setting 416 can be used to enforce data loss prevention ("DLP") measures on a user device by selecting between buttons 426. When enabled, one or more DLP policies can be carried out by the user device. DLP policies can be implemented to restrict an application in a manner that prevents the unwanted loss of data by identifying certain types of sensitive information and preventing it from being shared in an unauthorized manner. The policies can be specific to one application or a group of applications. As an example, a text-based document stored in an enterprise repository can include a DLP policy for the document specifying that if the document is transmitted to a user device, the user of that user device should not be able to copy and paste content from the document or print the document. The user device can follow such DLP policies based on setting 416, for example.

Setting 418 can be used to implement network access controls at the user device, or for specific applications on the user device, by selecting between buttons 429. Network access control can be a policy that describes how to secure access to network nodes when a device, or an application, initially attempts to access the network. The network access control can include any policies or controls that influence or dictate where and how a user device or application is allowed to connect to various network locations. While the setting 418 shown in FIG. 4 would apply to a user device in its entirety, it could also be applied on a per-application basis. In that example, the GUI would allow the administrator to search for and select one or more applications for which to apply the network access control.

FIG. 5 is a system diagram of an example system for performing the example methods discussed above. The system includes a console 510 that is communicatively coupled to a management server 520. An administrator can utilize the console 510 to configure a compliance rule, such as by utilizing a GUI as shown in FIGS. 3 and 4. The GUI can be displayed on the console 510. An administrator can access the console 510 by, for example, navigating to a web location using a web browser on a computing device. The console 510 can also be provided as a standalone application on a computing device. The administrator can use the console 510 to perform various management activities, such as enrolling a user device, creating user groups, pushing device updates, and creating profiles for users or user devices. Because the console 510 can be communicatively coupled to the management server 520, settings or instructions saved at the console 510 can also be saved at, or automatically transmitted to, the management server 520.

The management server 520 can include multiple servers, processors, and computing devices. In some examples, the management server 520 is a network of servers, some of which can be located remotely from one another. In another example, the management server 520 is a single server with multiple purposes. In yet another example, the management server 520 is a server (or group of servers) dedicated to the operations described herein. A system administrator can have privileges associated with managing, editing, revising, and otherwise administrating functions associated with the management server 520. The administrator can perform these functions through the console 510, for example.

The management server 520 can receive rule configurations established at the console 510 and use those configurations to generate compliance rules. The management server can also notify a user device 530—or an application 540, 550 on a user device—that a new compliance rule is available. The user device 530 can be any computing device, such as a smartphone, laptop, tablet, personal computer, or workstation. A user device 530 can include a non-transitory, computer-readable medium containing instructions that are executed by a processor. Example non-transitory, computer-readable mediums include RAM and ROM, disks, and other memory and storage that is accessible by a USB port, a floppy drive, CD-ROM or DVD-ROM drive, and a flash drive, among others.

The management server 520 can also provide a settings endpoint for applications 540, 550, either at the management server 520 itself or at another entity, such as a server, that is at least partially controlled by the management server 520. The settings endpoint can be a backend location accessible to applications 540, 550. The applications 540, 550 can check in at the management server 520 or settings endpoint, or both, to retrieve new or updated compliance rules. The applications 540, 550 can save compliance rules in a storage location 560 on the user device 530. The storage location 560 can be a memory store accessible to the applications 540, 550 on the user device 530.

Each application 540, 550 on the user device 530 can utilize application-specific compliance rules 544, 554. The application-specific compliance rules 544, 554 can be stored in memory storage locations dedicated for use by the applications 540, 550 or can be stored in the storage location 560 of the user device 530. Each application 540, 550 can also include a compliance engine 542, 552. In some examples, each application 540, 550 includes an identical compliance engine 542, 552, but in other examples the applications 540, 550 can include custom compliance engines 542, 552 that differ from one another. For example, compliance engines 542 and 552 can differ by being equipped to execute different types of commands from one another, in an example. This can be done, in one example, by implementing different methods of the compliance SDK for the different applications 540, 550.

A compliance engine 542, 552 can be a portion of an application 540, 550, such as an SDK that has been added to the code of the application 540, 550. The compliance engine 542, 552 can be configured to retrieve a compliance rule 544, 554 from storage, retrieve information about the user device 530 that is relevant to the retrieved compliance rule 544, 554, and perform a comparison or evaluation such as that described in stage 240 of FIG. 2.

The user device 530 can also include an agent application 570. The agent application 570 can be an application dedicated to management functionality, such as enforcing device-level compliance rules established at the management server 520. The agent application 570 can operate on the user device 530 in conjunction with other applications 540, 550 that perform application-specific compliance enforcement. For example, the agent application 570 can be the first application or second application describe with respect to FIG. 1B, or it can be another application separate from those applications, as shown in FIG. 5. The agent application 570 can operate side-by-side the other applications 540, 550 of FIG. 5, as explained in the discussion of FIG. 1B.

Additionally, the management server 520 can include an enrollment component and an administrator component, which can both be used for the process of enrolling a user device 530. For example, a user device 530 can communicate with the enrollment component during the initial stages of enrollment. In some examples, the enrollment component can provide a token to the user device 530 indicating that the user device 530 has been authenticated and is permitted to communicate and enroll with the management server 520. The management server 520 or enrollment component can provide the user device 530 with information regarding how to access and communicate with the administrator component in order to continue the enrollment process.

In some examples, the administrator component can request a token from the user device 530, indicating that the user device 530 has been authenticated and is permitted to continue the enrollment process with the administrator component. Upon receiving the token, the administrator component can continue the enrollment process. The administrator component can also provide a console for an administrator to configure and monitor the status of the user device 530 and the enrollment process. In some examples, the administrator component can be dedicated to a particular enterprise or group of enterprises, while the enrollment component can be shared across multiple different enterprises.

The enrollment and administrator components of the management server 520 can be utilized when the user device 530 is a managed device. However, the application-specific compliance enforcement discussed within this disclosure can be applied to an unmanaged device without any communication to or from a management server 520 or console 510. For example, the console 510 can be used to configure an application 540, 550 that is available from a public application store. In that example, the compliance rules 544, 554 can be contained within the corresponding application 540, 550 and can be downloaded onto the user device 530 by downloading the application 540, 550 to the user device. The application 540, 550 can then perform the stages of FIG. 1A, 1B, or 2 while the user device 530 remains in an unmanaged state, without access to a management server 520.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for compliance enforcement, comprising:
    storing, at a memory store of a user device, a first compliance rule that applies to a first application and specifies a first condition and a first remedial action to be performed by the first application;
    storing, at the memory store of the user device, a second compliance rule that applies to a second application and specifies a second condition and a second remedial action to be performed by the second application;
    checking in with a management server within a predetermined period of time;
    retrieving from the management server an updated first compliance rule that applies to the first application and specifies the first condition and an updated first remedial action to be performed by the first application;
    storing the updated first compliance rule at the memory store of the user device;
    determining, by a first compliance engine of the first application, whether the first condition is present;
    based on determining that the first condition is present, performing the updated first remedial action by the first application;
    determining, by a second compliance engine of the second application, whether the second condition is present;
    based on determining that the second condition is present, performing the second remedial action by the second application;
    receiving escalation instructions from a management server, the escalation instructions causing the user device to:
        perform an escalation action that causes the first condition to no longer be present at the user device; and
        reverse the updated first remedial action.

2. The method of claim 1, wherein the first and second compliance engines are based on the same software-development kit ("SDK").

3. The method of claim 1, wherein at least one of the first condition, the second condition, the updated first remedial action, and the second remedial action can be assigned to at least one of the first and second compliance engines using a graphical user interface ("GUI") remote from the user device.

4. The method of claim 1, wherein:
    the first condition and second condition are the same, and
    the updated first remedial action and second remedial action are different.

5. The method of claim 1, wherein the first application is at least one of an email application and a file-sharing application.

6. The method of claim 1, wherein the user device is not enrolled with a device-management system.

7. The method of claim 1, wherein:
    the updated first remedial action limits functionality of the first application, and
    the second remedial action limits functionality of the second application.

8. A non-transitory, computer-readable medium comprising instructions that, when executed by a processor of a user device, perform stages for performing compliance enforcement, the stages comprising:
    storing, at the user device, a first compliance rule that applies to a first application and specifies a first condition and a first remedial action to be performed by the first application;
    storing, at the user device, a second compliance rule that applies to a second application and specifies a second condition and a second remedial action to be performed by the second application;
    checking in with a management server within a predetermined period of time;
    retrieving from the management server an updated first compliance rule that applies to the first application and specifies the first condition and an updated first remedial action to be performed by the first application;
    storing the updated first compliance rule at the memory store of the user device;
    determining, by a first compliance engine of the first application, whether the first condition is present;
    based on determining that the first condition is present, performing the updated first remedial action by the first application;
    determining, by a second compliance engine of the second application, whether the second condition is present;
    based on determining that the second condition is present, performing the second remedial action by the second application;
    receiving escalation instructions from a management server, the escalation instructions causing the user device to:
        perform an escalation action that causes the first condition to no longer be present at the user device; and
        reverse the updated first remedial action.

9. The non-transitory, computer-readable medium of claim 8, wherein the first and second compliance engines are based on the same software-development kit ("SDK").

10. The non-transitory, computer-readable medium of claim 8, wherein at least one of the first condition, the second condition, the updated first remedial action, and the second remedial action can be assigned to at least one of the first and second compliance engines using a graphical user interface ("GUI") remote from the user device.

11. The non-transitory, computer-readable medium of claim 8, wherein:
    the first condition and second condition are the same, and the updated first remedial action and second remedial action are different.

12. The non-transitory, computer-readable medium of claim 8, wherein the first application is at least one of an email application and a file-sharing application.

13. The non-transitory, computer-readable medium of claim 8, wherein the user device is not enrolled with a device-management system.

14. The non-transitory, computer-readable medium of claim 13, wherein:
the updated first remedial action limits functionality of the first application, and
the second remedial action limits functionality of the second application.

15. A system for performing compliance enforcement, comprising:
a user device having a processor and memory storage;
wherein the memory storage contains a non-transitory, computer-readable medium comprising instructions that, when executed by the processor, carry out stages comprising:
storing, at a memory store of a user device, a first compliance rule that applies to a first application and specifies a first condition and a first remedial action to be performed by the first application;
storing, at the memory store of the user device, a second compliance rule that applies to a second application and specifies a second condition and a second remedial action to be performed by the second application;
checking in with a management server within a predetermined period of time;
retrieving from the management server an updated first compliance rule that applies to the first application and specifies the first condition and an updated first remedial action to be performed by the first application;
storing the updated first compliance rule at the memory store of the user device;
determining, by a first compliance engine of the first application, whether the first condition is present;
based on determining that the first condition is present, performing the updated first remedial action by the first application;
determining, by a second compliance engine of the second application, whether the second condition is present;
based on determining that the second condition is present, performing the second remedial action by the second application;
receiving escalation instructions from a management server, the escalation instructions causing the user device to:
perform an escalation action that causes the first condition to no longer be present at the user device; and
reverse the updated first remedial action.

16. The system of claim 15, wherein the first and second compliance engines are based on the same software-development kit ("SDK").

17. The system of claim 15, wherein at least one of the first condition, the second condition, the updated first remedial action, and the second remedial action can be assigned to at least one of the first and second compliance engines using a graphical user interface ("GUI") remote from the user device.

18. The system of claim 15, wherein:
the first condition and second condition are the same, and
the updated first remedial action and second remedial action are different.

19. The system of claim 15, wherein the first application is at least one of an email application and a file-sharing application.

20. The system of claim 15, wherein the user device is not enrolled with a device-management system.

\* \* \* \* \*